United States Patent [19]
Crossman

[11] 3,811,457
[45] May 21, 1974

[54] OVER PRESSURIZATION RELEASE DEVICE AND VALVE

[75] Inventor: Richard L. Crossman, Tallmadge, Ohio

[73] Assignee: The Goodyear Tire & Rubber Company, Akron, Ohio

[22] Filed: Sept. 30, 1971

[21] Appl. No.: 185,070

[52] U.S. Cl............. 137/73, 137/226, 137/528
[51] Int. Cl............. F16k 17/38, F16k 15/20
[58] Field of Search...... 137/226, 72, 73, 74, 512.2, 137/516.15, 516.23, 467; 152/427; 122/504.1, 504.3; 220/89 B

[56] References Cited
UNITED STATES PATENTS

| | | | |
|---|---|---|---|
| 1,325,019 | 12/1919 | Hussey | 137/226 |
| 1,434,708 | 11/1922 | Kelsey | 137/226 |
| 2,194,541 | 3/1940 | Buttner | 137/73 |
| 3,542,062 | 11/1970 | Zahid et al | 137/226 X |
| 3,559,668 | 2/1971 | Crossman | 137/73 |

Primary Examiner—Alan Cohan
Assistant Examiner—Richard Gerard
Attorney, Agent, or Firm—F. W. Brunner, P. E. Milliken, Oldham & Oldham

[57] ABSTRACT

Mechanism for use with an inflation valve for any fluid pressure vessel, such as a pneumatic tire, and including a pressure-triggered release area concentric with the valve and comprising a rupture diaphragm or blow-out piston responsive to excessive fluid pressure and allowing the pressure to escape to the atmosphere at a rate sufficient so that the back pressure down stream in the vessel does not exceed that of the predetermined blow-out level.

8 Claims, 3 Drawing Figures

3,811,457

PATENTED MAY 21 1974

OVER PRESSURIZATION RELEASE DEVICE AND VALVE

BACKGROUND

Infrequently pneumatic tires blow-out during or after inflation because of the application thereto of excessive air pressure. Such blow-outs can cause serious injury. It has been proposed heretofore to provide pressure relief means to prevent such blowouts but known devices are subject to one or more objections. They may be so expensive or bulky that their use is prohibitive. They may work well when new, but after exposure to service and weather, they may fail to operate just when needed. Also, good pressure relief mechanisms should have relatively large openings once opened, which is often not the case with spring pressure relief valves.

SUMMARY OF THE INVENTION

The pressure relief mechanism of the invention includes a valve stem having valve means therein. Surrounding the stem is a cup which slidably receives ring-shaped piston means which also slide on the valve stem, and means releaseably hold the piston means in airtight relation between the cup and stem. The valve stem has fluid passages to the inside of the cup so that when excessive pressures build up behind the piston means the means releaseably holding the piston means let go to allow the piston means to blow-out of the cup.

The general object of the invention is to provide pressure-release mechanism characterized by relatively small size and cost, and which better performs its function after long service and exposure to the weather. Other objects include a comparatively large fluid escape once the mechanism releases, safely against injury upon release, arrangement so inflation pressure applies itself first to the release mechanism whereby the back pressure down stream in the vessel does not exceed the predetermined blow-out level, and the use of O-ring as pressure release controls. Still another object of the invention is to provide an assembly as described wherein means are provided to allow the escape of fluid in the event a selected temperature is exceeded regardless of the attendant fluid pressure.

Figure 1:
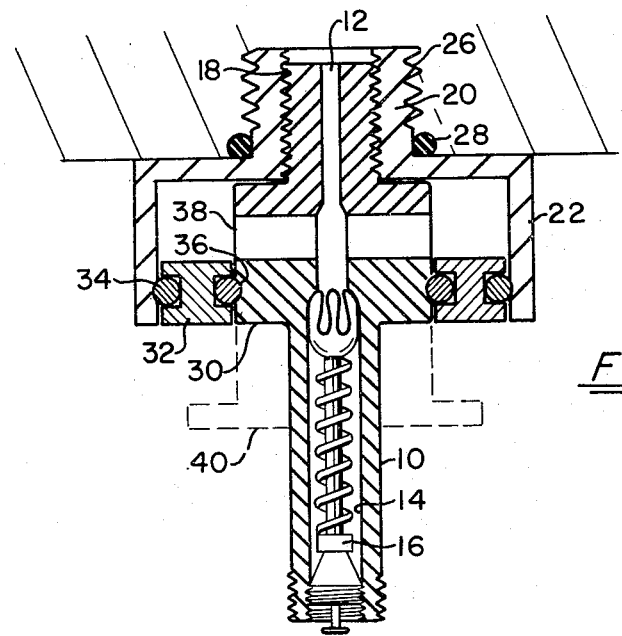
FIG. 1 is a longitudinal cross-sectional view of a pressure relief mechanism of the invention incorporated with a pneumatic tire inflation valve.

In the form of the invention shown in FIG. 1, this is particularly adapted to use as an inflation valve and pressure release mechanism for use with a pneumatic tire, although the principles thereof can be employed in conjunction with any vessel inflated with air or liquid. The numeral 10 indicates generally a valve stem having an axial bore 12 of relatively small diameter, and a conventional counterbore 14 receiving a conventional tire valve 16.

The inner end of the valve stem 10 is threaded at 18 and secures to a complementary thread on the inside of a boss 20 integral with a cup 22. For sealing purposes an O-ring 24 may be interposed. The exterior of the boss 20 is threaded at 26 for engagement with a tire rim, and with a sealing O-ring 28 provided.

The wall of the cup 22 is positioned parallel with an enlarged cylindrical body 30 on the valve stem 10 and a ring-like piston 32 is received in the cup 22 around the body 30. The piston is held in the cup by a pair of O-rings 34 and 36 carried in half-round grooves in the cup, piston, and body. A plurality of passages 38 extend radially from the bore 12 to the inside of the cup 22 behind the piston 32.

In operation, with the assembly threaded into a pneumatic tire rim, a conventional air hose will be applied to the valve stem 10 to inflate the tire on the rim in the usual manner through the valve 16. The tire inflating pressure will not only pass into the tire through bore 12 but also is applied behind the piston 32. The O-rings 34 and 36 hold the piston in place and in an air-tight manner until such time as the fluid pressure behind the piston builds up to a predetermined level which should not be exceeded in the tire being inflated. The O-rings 34 and 36 then fail and the piston 32 blows out leaving relatively large passages to the atmosphere. A shoulder 40 on the end of the cylindrical body 30 may be provided to prevent the piston 32 from blowing off of the valve stem 10.

By appropriately compounding the O-rings 34 and 36 from harder or softer stock, and by altering the clearances between the piston 32, its cup 22, and the body 30, exactly the yielding pressure desired by the piston can be achieved. The O-rings normally yield by flow or by shear, or by a combination thereof.

Figure 2:
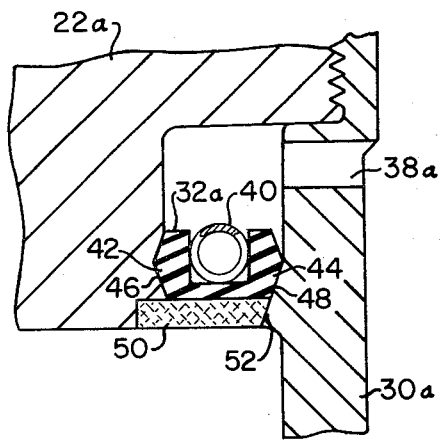
FIG. 2 is a view similar to FIG. 1, but of only a portion thereof, and on a somewhat larger scale, of a modification of the invention.

The embodiment of the invention shown in FIG. 2 is like that of FIG. 1, but a somewhat different yielding member is provided. Specifically, the cup 22a receives a ring-shaped gasket 32a of rubber or plastic having a U-shape in cross-section as shown. Positioned inside of the gasket 32a is an endless coiled spring 40 which forces the sides of the gasket into contact with the cup 22a and the cylindrical body 30a. The gasket 32a is normally formed with circular ribs 42 and 44, and the cup and body with circular ribs 46 and 48 which engage each other to hold the gasket 32a in the cup 22a until a predetermined fluid pressure is exceeded as imparted behind the gasket via passages 38a.

Covering the outer surface of the gasket 32a is a sealing washer 50 of Teflon, or the like, having its outer rim received in a counterbore in the end of the cup 22a. The inner rim of the washer 50 engages a shallow shoulder 52 on the body 30a.

Figure 3:
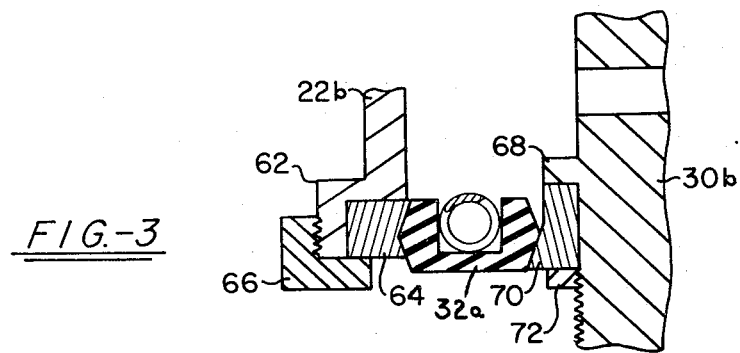
FIG. 3 is a view similar to FIG. 2 but illustrating the inclusion of means for allowing the escape of fluid pressure when a dangerous temperature is reached in the assembly and regardless of pressure.

FIG. 3 shows a further modification of the invention wherein the cup 22b is formed with a cup-shaped outer end 62 which receives a shouldered ring 64 made of eutectic material, such as Woods Metal, which will melt at a selected temperature. The ring 64 is retained in position by a cap 66.

The valve stem 30b is provided with a shoulder 68 against which engages a second shouldered ring 70, again of eutectic material, this ring being held in place by an interally threaded ring 72. The piston means 32a has ribs which engage against the shoulders of eutectic rings 64 and 70.

The operation of the construction of FIG. 3 is like that of FIG. 2 insofar as holding against fluid pressure is concerned. However, the temperature responsive rings 64 and 70 will melt out and allow release of fluid pressure in the event that a selected temperature is exceeded in the assembly.

While certain best known embodiments of the invention have been specifically illustrated and described, the scope of the invention is not to be limited thereto but is defined by, and within the spirit of, the appended claims.

What is claimed is:

1. A pressure release valve, comprising:

a cup;

a fluid conducting valve stem passing through the cup, the stem having fluid passages therethrough in communication with the cup;

a piston element slidingly received within the cup and about the stem; and sealing means about the piston element for releaseably holding the piston element in an air-tight relationship between the cup and the stem, and thus creating a fluid chamber within the cup in communication with the valve stem passages, said piston element being responsive to pressure conditions in the chamber and movable to a position out of the cup upon a predetermined pressure condition in the chamber to provide communication between the ambient atmosphere and valve stem passages.

2. The pressure release valve as recited in claim 1 wherein means are provided on the valve stem between the piston and one end thereof for preventing the removal of the piston from said end of the valve stem.

3. The presure release valve as recited in claim 1 wherein the sealing means comprises a eutectic material which melts at a characteristic temperature thereof thus opening the fluid chamber.

4. The pressure release valve as recited in claim 1 wherein the piston element comprises an endless coiled spring in engagement with a ring-shaped gasket, the gasket and coiled spring interrelationship being such as to release the gasket from sealing engagement with the sealing means when a pre-selected fluid pressure level is exceeded in the fluid chamber.

5. The pressure release valve as recited in claim 4 wherein the sealing means comprises a eutectic material placed about the circumference of the stem and cup.

6. The combination defined in claim 1 wherein the sealing means releaseably holding the piston means are a pair of O-rings.

7. The combination defined in claim 1 wherein the piston element and sealing means comprise a gasket having a U-shape in cross section, an endless coiled spring inside the legs of the U-shaped gasket, interengaging ribs on the gasket, cup and valve stem, and a plastic washer extending between the valve stem and the cup and covering the gasket.

8. The combination defined in claim 1 wherein a plastic washer extends between the valve stem and the cup and covers the piston element and sealing means.

* * * * *